(12) United States Patent
Mori et al.

(10) Patent No.: US 11,204,074 B2
(45) Date of Patent: Dec. 21, 2021

(54) SHOCK ABSORBER

(71) Applicant: HITACHI AUTOMOTIVE SYSTEMS, LTD., Hitachinaka (JP)

(72) Inventors: Shunsuke Mori, Yokohama (JP); Takao Nakadate, Yamato (JP); Yu Ishimaru, Fukushima (JP); Osamu Yuno, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 16/643,164

(22) PCT Filed: Sep. 4, 2018

(86) PCT No.: PCT/JP2018/032686
§ 371 (c)(1),
(2) Date: Feb. 28, 2020

(87) PCT Pub. No.: WO2019/049844
PCT Pub. Date: Mar. 14, 2019

(65) Prior Publication Data
US 2020/0191229 A1   Jun. 18, 2020

(30) Foreign Application Priority Data
Sep. 5, 2017   (JP) .............. JP2017-170311

(51) Int. Cl.
*F16F 9/34* (2006.01)
*F16F 9/32* (2006.01)
*F16F 9/44* (2006.01)

(52) U.S. Cl.
CPC .......... *F16F 9/3405* (2013.01); *F16F 9/3214* (2013.01); *F16F 9/446* (2013.01)

(58) Field of Classification Search
CPC ........ F16F 9/3405; F16F 9/3214; F16F 9/446; F16F 9/464; F16F 9/3488
(Continued)

(56) References Cited

U.S. PATENT DOCUMENTS

| 4,723,640 | A | * | 2/1988 | Beck | .............. B60G 17/08 |
| | | | | | 137/614.2 |
| 5,035,306 | A | * | 7/1991 | Ashiba | ............. F16F 9/46 |
| | | | | | 188/282.3 |

(Continued)

FOREIGN PATENT DOCUMENTS

| JP | 2008-249107 | 10/2008 |
| JP | 2009-281584 | 12/2009 |

OTHER PUBLICATIONS

International Search Report dated Oct. 16, 2018 in International (PCT) Application No. PCT/JP2018/032686 with English-language translation.

(Continued)

*Primary Examiner* — Thomas W Irvin
(74) *Attorney, Agent, or Firm* — Wenderoth, Lind & Ponack, L.L.P.

(57) ABSTRACT

Provided is a shock absorber that is so designed that fail-down is prevented, which is caused when solenoid thrust is relatively small. The shock absorber comprises a chamber disposed on one side of a valve element and communicating with a cylinder's one side chamber and a cylinder's other side chamber, a first communication passage allowing the chamber and the cylinder's one side chamber to communicate with each other, and a second communication passage allowing the chamber and the cylinder's other side chamber to communicate with each other. The first communication passage includes a first orifice, and the second communication passage includes a second orifice.

10 Claims, 4 Drawing Sheets

(58) Field of Classification Search
USPC ............... 188/322.15, 322.18, 282.4, 282.2
See application file for complete search history.

(56) References Cited

U.S. PATENT DOCUMENTS

| | | | | |
|---|---|---|---|---|
| 5,078,239 A * | 1/1992 | Kobayashi | ............ | F16F 9/466 188/266.7 |
| 5,168,965 A * | 12/1992 | Huang | ............ | F16F 9/46 188/282.2 |
| 5,392,883 A * | 2/1995 | Huang | ............ | F16F 9/465 188/282.3 |
| 6,702,075 B2 * | 3/2004 | Hartel | ............ | F16F 9/464 188/282.1 |
| 6,729,446 B2 * | 5/2004 | Sakai | ............ | F16F 9/463 188/266.2 |
| 6,981,577 B2 * | 1/2006 | Katayama | ............ | F16F 9/465 188/267.1 |
| 7,757,826 B2 * | 7/2010 | Hayama | ............ | F16F 9/465 188/282.2 |
| 7,997,394 B2 * | 8/2011 | Yamaguchi | ............ | F16F 9/465 188/282.2 |
| 8,544,619 B2 * | 10/2013 | Yamaguchi | ............ | F16F 9/3485 188/285 |
| 8,997,952 B2 * | 4/2015 | Goetz | ............ | F16F 9/464 188/282.4 |
| 10,415,663 B2 * | 9/2019 | Luedecke | ............ | F16F 9/3405 |
| 10,760,637 B2 * | 9/2020 | Manger | ............ | F16F 9/46 |
| 10,876,590 B2 * | 12/2020 | Miwa | ............ | F16F 9/464 |
| 10,941,830 B2 * | 3/2021 | Kadokura | ............ | F16F 9/464 |
| 2003/0132073 A1 * | 7/2003 | Nakadate | ............ | F16F 9/3214 188/282.2 |
| 2006/0225976 A1 * | 10/2006 | Nakadate | ............ | F16F 9/464 188/266 |
| 2008/0236966 A1 | 10/2008 | Yamaguchi | | |
| 2009/0242339 A1 | 10/2009 | Nakadate et al. | | |
| 2015/0275999 A1 * | 10/2015 | Mori | ............ | F16F 9/465 188/313 |
| 2017/0328440 A1 * | 11/2017 | Sakuta | ............ | F16F 9/34 |
| 2020/0032872 A1 * | 1/2020 | Kadokura | ............ | F16F 9/103 |
| 2020/0166097 A1 * | 5/2020 | Kadokura | ............ | F16F 9/465 |

OTHER PUBLICATIONS

English translation of Written Opinion of the International Searching Authority dated Oct. 16, 2018 in International (PCT) Application No. PCT/JP2018/032686.

* cited by examiner

SHOCK ABSORBER

TECHNICAL FIELD

The invention relates to a shock absorber that controls a hydraulic fluid flow responding to the strokes of a piston rod to generate a damping force.

BACKGROUND ART

Patent Literature 1, for example, discloses a shock absorber in which a damping force adjusting mechanism with an actuator is internally installed in a cylinder. Patent Literature 2 also discloses a damping force adjusting shock absorber in which a fail-safe mechanism is incorporated.

CITATION LIST

Patent Literature

PTL 1: Japanese Unexamined Patent Application Publication (Kokai) No. 2008-249107
PTL 2: Japanese Unexamined Patent Application Publication (Kokai) No. 2009-281584

SUMMARY OF INVENTION

Technical Problem

When a solenoid that is a part of an actuator generates a relatively small thrust, a damping force adjusting mechanism is affected by a reaction force of a fail-safe mechanism, a hydrodynamic force or the like. The damping force adjusting mechanism is then likely to transfer to a fail state while normal control is carried out.

An object of the invention is to provide a shock absorber in which a damping force adjusting mechanism is prevented from transferring to a fail state during normal control when solenoid thrust is relatively small.

Solution to Problem

A shock absorber according to one embodiment of the invention comprises a cylinder in which a hydraulic fluid is sealingly contained, a piston slidably inserted in the cylinder and dividing an interior portion of the cylinder into a cylinder's one side chamber and a cylinder's other side chamber, a piston rod including one end coupled to the piston and the other end extending outside from the cylinder, an expansion-side passage and a compression-side passage disposed in the piston, an expansion-side main valve disposed in the expansion-side passage, an expansion-side back pressure chamber in which a valve-opening pressure on the expansion-side main valve is adjusted, a compression-side main valve disposed in the compression-side passage, a compression-side back pressure chamber in which a valve-opening pressure on the compression-side main valve is adjusted, a common passage allowing the expansion-side back pressure chamber and the compression-side back pressure chamber to communicate with each other, a valve element configured to adjust passage area of the common passage, an actuator configured to bias the valve element in one direction when current is applied, a biasing member configured to bias the valve element in the other direction, a chamber disposed on one side of the valve element and communicating with the cylinder's one side chamber and the cylinder's other side chamber, a first communication passage allowing the chamber and the cylinder's one side chamber to communicate with each other, and a second communication passage allowing the chamber and the cylinder's other side chamber to communicate with each other. The first communication passage includes a first orifice, and the second communication passage includes a second orifice.

According to one embodiment of the invention, it is possible to prevent fail-down from occurring when solenoid thrust is relatively small.

DESCRIPTION OF EMBODIMENTS

First Embodiment

A first embodiment of the invention will be described with reference to the attached drawings.

Figure 1:
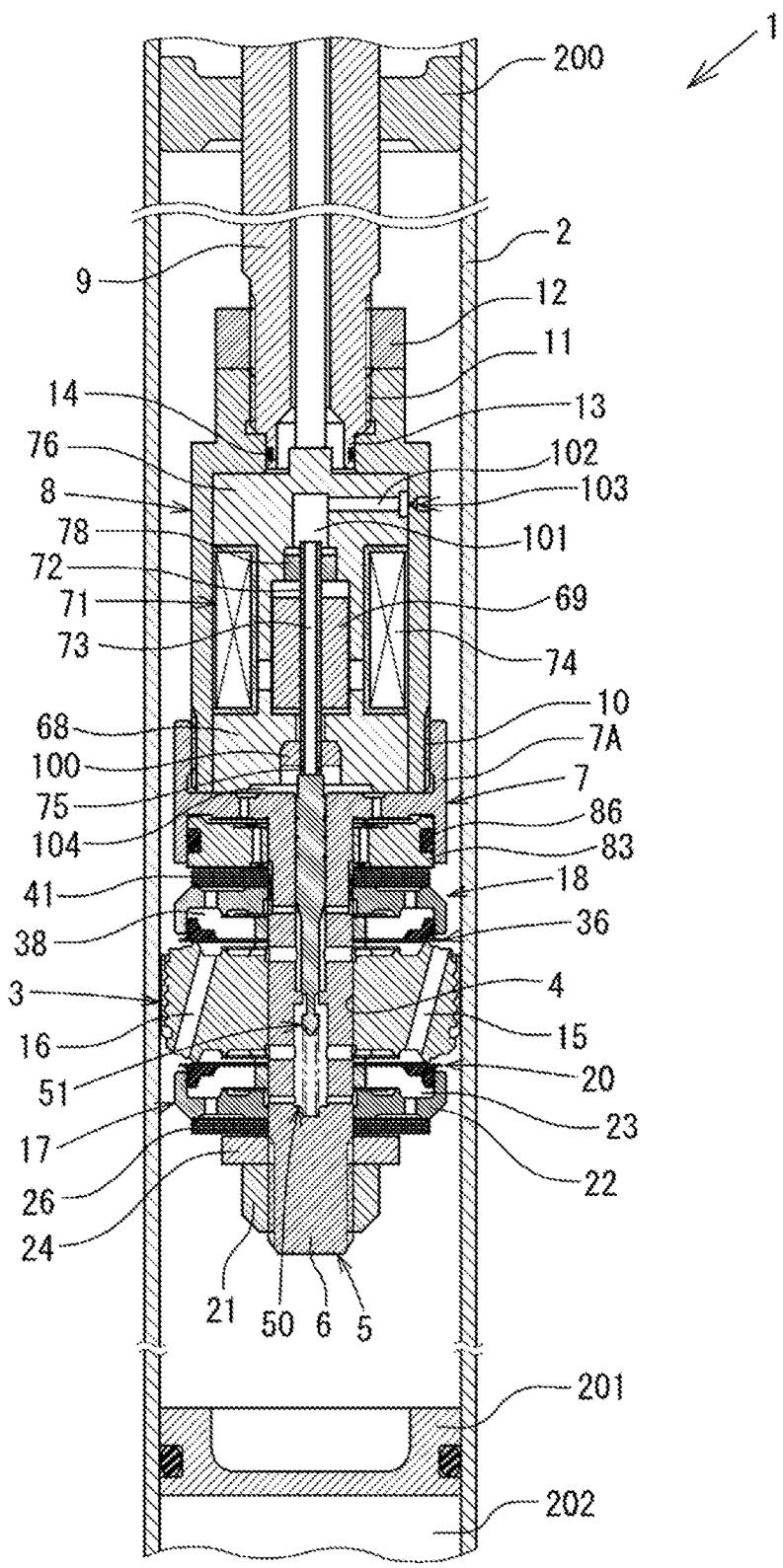
FIG. 1 is a sectional view of a major part of a shock absorber according to a first embodiment.

FIG. 1 is a sectional view of a major part of a shock absorber 1 according to the first embodiment. In the following description, an upward direction (upper side) and a downward direction (lower side) on FIG. 1 are an upward direction (upper side) and a downward direction (lower side) of the shock absorber 1. The first embodiment is a single-cylinder damping force adjusting hydraulic shock absorber and yet is applicable to a multi-cylinder damping force adjusting hydraulic shock absorber with a reservoir.

As illustrated in FIG. 1, a piston 3 is slidably fitted in a cylinder 2. The piston 3 divides an interior portion of the cylinder 2 into two chambers including a cylinder's upper chamber 2A as a cylinder's one side chamber and a cylinder's lower chamber 2B as a cylinder's other side chamber. Disposed inside the cylinder 2 is a free piston 201 that is vertically movable in the cylinder. The free piston 201 divides the interior portion of the cylinder 2 into the cylinder's lower chamber 2B located on the piston 3 side (upper side) and a gas chamber 202 located on a bottom portion side (lower side). Oil is sealingly contained as a hydraulic fluid in the cylinder's upper and lower chambers 2A and 2B. High-pressure gas as a hydraulic fluid is sealingly contained in the gas chamber 202.

Figure 2:
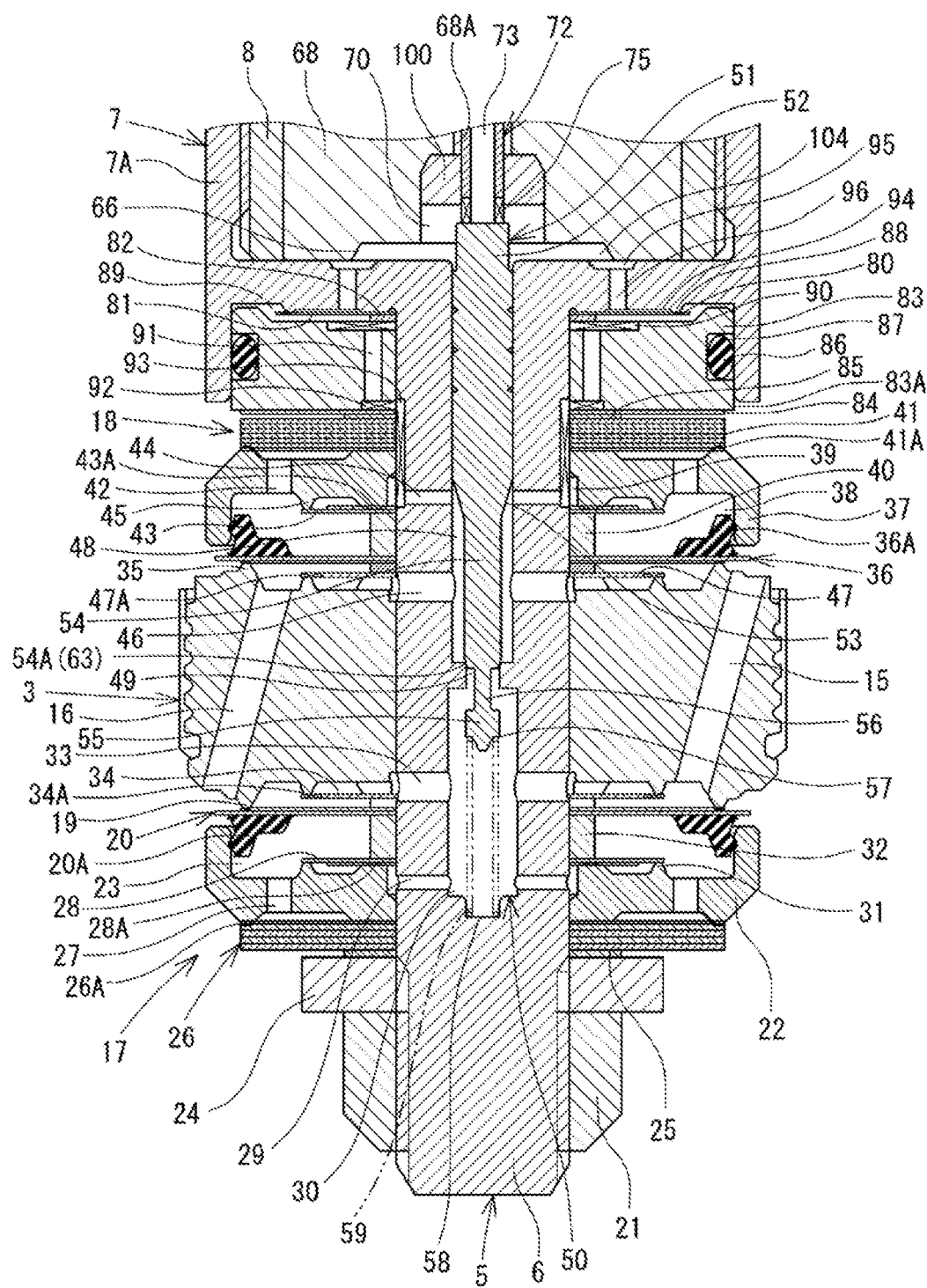
FIG. 2 is an enlarged view of a part of FIG. 1.

The piston 3 includes a shaft hole 4 through which a shaft portion 6 of a piston bolt 5 extends. The piston bolt 5 includes a head portion 7 in a substantially cylindrical shape. An upper portion of the head portion 7 is connected to a lower end portion of a substantially cylindrical case member 8 through a screw coupling portion 10. A shaft hole 50 (common passage) is formed in the piston bolt 5. The shaft hole 50 extends along an axial direction (vertical direction) toward a distal end (downward) and includes an upper end that opens in a center of a bottom surface of the head portion 7. As illustrated in FIG. 2, the shaft hole 50 comprises an axial passage 48 that is formed in an upper portion of the shaft hole 50 and opens at an upper end, an axial passage 30 that is formed in a lower portion of the shaft hole 50, and an axial passage 49 allowing the axial passages 30 and 48 to communicate with each other. The axial hole 50 has a diameter (internal diameter) that is largest at the axial passage 30, less at the axial passage 48, and further less at the axial passage 49.

As illustrated in FIG. 1, the case member 8 includes an upper end portion connected to a lower end portion of a piston rod 9 through a screw coupling portion 11. The piston rod 9 extends through a rod guide 200 mounted on an upper end portion of the cylinder 2, and an upper end (other end) of the piston rod 9 extends outside from the cylinder 2. A nut 12 is screwed onto the lower end portion of the piston rod 9. The nut 12 is fastened while in contact with an upper end of the case member 8, to thereby repress the loosening of the screw coupling portion 11. A small diameter portion 13 is formed in a lower end of the piston rod 9. An annular groove is formed in an outer circumferential surface of the small diameter portion 13. An O-ring 14 is mounted in the annular groove. The O-ring 14 seals a gap between the case member 8 and the piston rod 9. Provided to the piston 3 are an expansion-side passage 15 having one end (upper end) that opens on the cylinder's upper chamber 2A side and a compression-side passage 16 having one end (lower end) that opens on the cylinder's lower chamber 2B side. An expansion-side damping valve 17 is provided to a lower end of the piston 3. The expansion-side damping valve 17 controls a flow of the hydraulic fluid in the expansion-side passage 15. Provided to an upper end of the piston 3 is a compression-side damping valve 18 that controls a flow of the hydraulic fluid in the compression-side passage 16.

As illustrated in FIG. 2, the expansion-side damping valve 17 comprises an expansion-side main valve 20 that is seated on an annular seat portion 19 formed close to an outer circumference of a lower end surface of the piston 3, a pilot case 22 that is fixed to the piston bolt 5 with a nut 21, and an expansion-side back pressure chamber 23 that is formed between a back surface of the expansion-side main valve 20 and the pilot case 22. Pressure in the expansion-side back pressure chamber 23 acts on the expansion-side main valve 20 in a valve-closing direction. Disposed between the nut 21 and the pilot case 22 are a washer 24, a retainer 25, and a disc valve 26 in order from bottom up. The disc valve 26 includes an inner circumferential edge portion that is held between an inner circumferential edge portion of the pilot case 22 and the retainer 25. The expansion-side main valve 20 is a packing valve including an annular seal portion 20A formed of an elastic body. The seal portion 20A contacts an inner circumferential surface of the pilot case 22 throughout the entire circumference.

The expansion-side back pressure chamber 23 is in communication with the cylinder's lower chamber 2B through a passage 27 formed in the pilot case 22 and the disc valve 26. The expansion-side back pressure chamber 23 is in constant communication with the cylinder's lower chamber 2B through an orifice 26A formed in the disc valve 26. The disc valve 26 is opened when the pressure in the expansion-side back pressure chamber 23 reaches predetermined pressure, and thus releases the pressure in the expansion-side back pressure chamber 23 into the cylinder's lower chamber 2B. The expansion-side back pressure chamber 23 is in communication through a disc-like expansion-side back pressure introducing valve 28 with a radial passage 29 that is formed in the piston bolt 5. The radial passage 29 is in communication with the axial passage 30 (common passage) that is formed in the piston bolt 5.

The expansion-side back pressure introducing valve 28 is a check valve that allows the hydraulic fluid to flow only in a direction from the radial passage 29 to the expansion-side back pressure chamber 23. The expansion-side back pressure introducing valve 28 is seated on an annular seat portion 31 that is formed in an upper surface of the pilot case 22 on an inner circumferential side of the passage 27. The expansion-side back pressure introducing valve 28 includes an inner circumferential edge portion that is held between the inner circumferential edge portion of the pilot case 22 and a spacer 32. The opening of the expansion-side back pressure introducing valve 28 brings the expansion-side back pressure chamber 23 into communication with the radial passage 29 through an orifice 28A that is formed in the expansion-side back pressure introducing valve 28.

The axial passage 30 is in communication with a radial passage 33 (compression-side exhaust passage) that is formed in the piston bolt 5. The radial passage 33 is in communication with the expansion-side passage 15 through a compression-side check valve 34 disposed in the piston 3. The radial passage 33 is in constant communication with the expansion-side passage 15 through an orifice 34A that is formed in the compression-side check valve 34. The compression-side check valve 34 allows the hydraulic fluid to flow only in a direction from the radial passage 33 to the expansion-side passage 15.

The compression-side damping valve 18 comprises a compression-side main valve 36 that is seated on an annular seat portion 35 formed close to an outer circumference of an upper end surface of the piston 3, a pilot case 37 that is fixed between the head portion 7 of the piston bolt 5 and the piston 3, and a compression-side back pressure chamber 38 that is formed between a back surface of the compression-side main valve 36 and the pilot case 37. Pressure in the compression-side back pressure chamber 38 acts on the compression-side main valve 36 in a valve-closing direction. The compression-side main valve 36 is a packing valve including an annular seal portion 36A formed of an elastic body. The seal portion 36A contacts an inner circumferential surface of the pilot case 37 throughout the entire circumference.

The compression-side back pressure chamber 38 is in communication with the cylinder's upper chamber 2A through a passage 42 formed in the pilot case 37 and a disc valve 41. The compression-side back pressure chamber 38 is in constant communication with the cylinder's upper chamber 2A through an orifice 41A that is formed in the disc valve 41. The disc valve 41 is opened when the pressure in the compression-side back pressure chamber 38 reaches predetermined pressure, and thus releases the pressure in the compression-side back pressure chamber 38 into the cylinder's upper chamber 2A. The compression-side back pressure chamber 38 is in communication with a radial passage 44 that is formed in the piston bolt 5 through a disc-like compression-side back pressure introducing valve 43 and a circumferential groove 39 formed in the inner circumferential surface of the pilot case 37. The radial passage 44 is in communication with the axial passage 48 (common passage) of the piston bolt 5.

The compression-side back pressure introducing valve 43 is a check valve that allows the hydraulic fluid to flow only in a direction from the radial passage 44 to the compression-side back pressure chamber 38. The compression-side back pressure introducing valve 43 is seated on an annular seat portion 45 that is formed in a lower surface of the pilot case 37 on an inner circumferential side of the passage 42. The compression-side back pressure introducing valve 43 includes an inner circumferential edge portion that is held between an inner circumferential edge portion of the pilot case 37 and a spacer 40. The opening of the compression-side back pressure introducing valve 43 brings the compression-side back pressure chamber 38 into communication with the radial passage 44 through an orifice 43A that is formed in the compression-side back pressure introducing valve 43.

The axial passage 48 is in communication with a radial passage 46 (expansion-side exhaust passage) that is formed in the piston bolt 5. The radial passage 46 is in communication with the compression-side passage 16 through an expansion-side check valve 47 disposed in the piston 3. The radial passage 46 is in constant communication with the compression-side passage 16 through an orifice 47A that is formed in the expansion-side check valve 47. The expansion-side check valve 47 allows the hydraulic fluid to flow only in a direction from the radial passage 46 to the compression-side passage 16.

A flow of the hydraulic fluid in the axial hole 50 (common passage) of the piston bolt 5 is controlled by a pilot valve. The pilot valve includes a valve spool 51 (valve element) that is slidably fitted in the axial hole 50. The valve spool 51 is a solid shaft and makes up the pilot valve together with the piston bolt 5. The valve spool 51 comprises a base portion 52 that is slidably fitted to an upper portion of the axial passage 48, or a portion above the radial passage 44, a valve portion 54 located inside the axial passage 48 and continuing into the base portion 52 through a tapered portion 53, a distal end portion 55 (fitted portion) located inside the axial passage 30 with the pilot valve closed (see FIG. 2), and a connect portion 56 connecting the distal end portion 55 and the valve portion 54. The valve spool 51 has a diameter (external diameter) that is largest at the base portion 52, less at the valve portion 54, further less at the distal end portion 55, and still further less at the connect portion 56. The valve portion 54 has an external diameter that is larger than an internal diameter of the axial passage 49.

Figure 3:
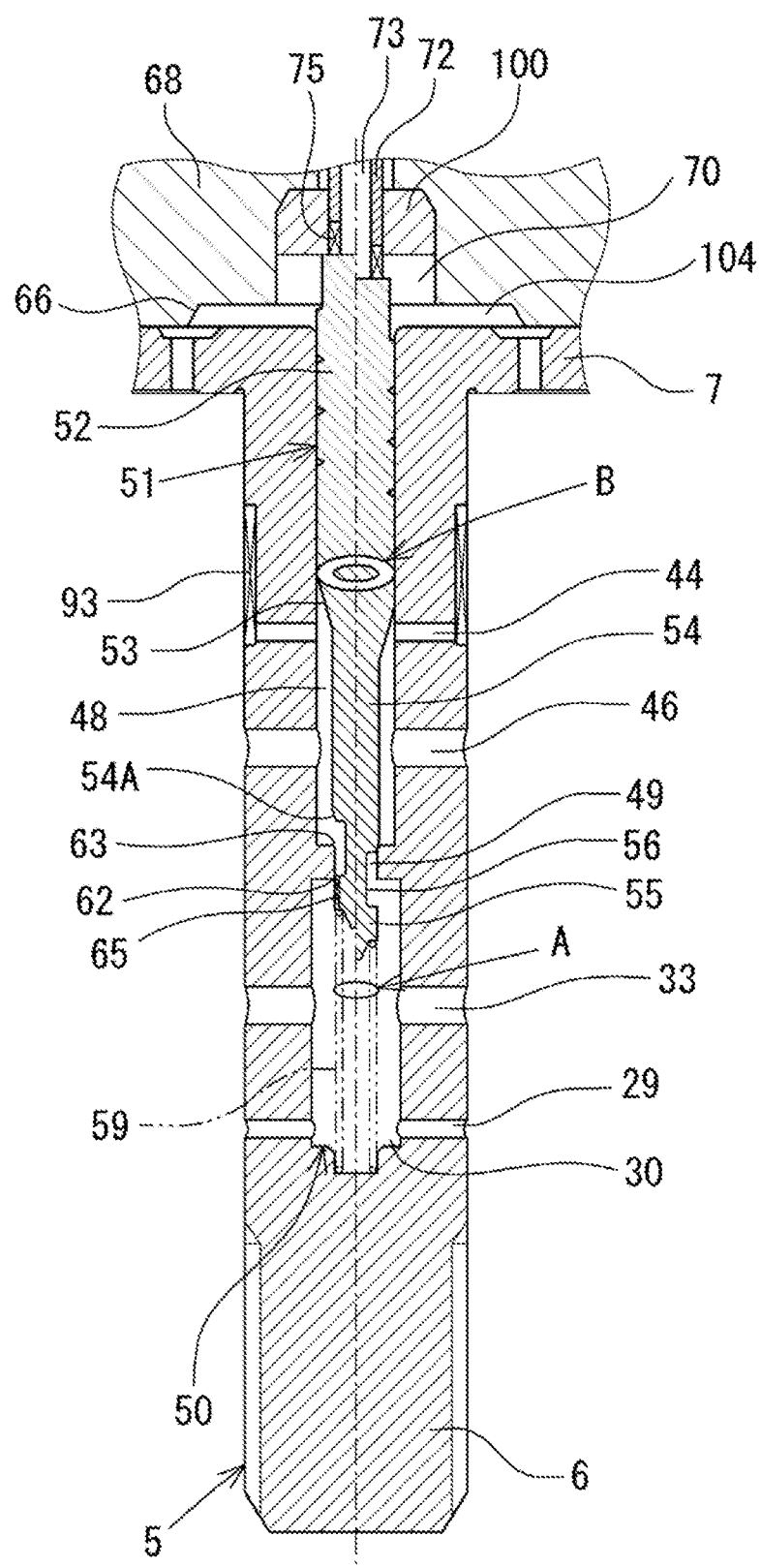
FIG. 3 is an explanatory view of operation of a pilot valve of the first embodiment, showing on the right side of a center line the pilot valve in a normal control position, and on the left side of the center line the pilot valve in a fail position.

The valve spool 51 is biased upward (in the other direction) relative to the piston bolt 5 by a valve spring 59 that is interposed between a spring seat portion 57 of the distal end portion 55 and a spring seat portion 58 of the piston bolt 5. An end surface of the base portion 52 is thus brought into contact with (pressed against) a rod 72 of a solenoid 71 discussed later. Although the first embodiment refers to the example in which the valve spring 59 is used as a biasing member, the biasing member may be an elastic rubber material or the like as long as the biasing member is capable of biasing the valve spool 51 as a valve element. As illustrated in FIG. 3, the distal end portion 55 of the valve spool 51 is so formed that a cross-section along a plane perpendicular to the axis is a circle including a cutout 65 with width across flats. When control current supplied to the solenoid 71 that is used as an actuator for controlling the shifting of the valve spool 51 is 0 A (when fail occurs), the valve spool 51 is stroked in a valve-opening direction (upward in FIG. 3), and the distal end portion 55 is fitted in the axial passage 49. A pair of orifices 62 is consequently formed between the distal end portion 55 and the axial passage 49. The pair of orifices 62 allows the axial passages 30 and 48 to communicate with each other. The first embodiment refers to a normally-open structure in which the valve spool 51 is biased in the valve-opening direction (other direction) when the current is 0 A. The structure may be a normally-closed structure in which the valve spool 51 is biased in a valve-closing direction (one direction) when the current is 0 A. Basically, the structure may be configured in any way as long as the hydraulic fluid flowing in the common passages through the valve spool is allowed to circulate when the current is 0 A.

An annular seat portion 63 is formed in a circumferential edge portion of an opening of an upper end (on the side close to the axial passage 48) of the axial passage 49. The valve portion 54 of the valve spool 51 is seated on the seat portion 63. A tapered seating surface 54A is formed in an outer circumferential edge portion of a lower end (on the side close to the connect portion 56) of the valve portion 54. The valve spool 51 is so configured that a substantially circular pressure-receiving surface A (see FIG. 3) of the distal end portion 55 receives pressure existing on the axial passage 30 side, and an annular pressure-receiving surface B (see FIG. 3) of the tapered portion 53 receives pressure existing on the axial passage 48 side while the seating surface 54A of the valve spool 51 is seated on the seat portion 63 formed in the axial hole 50 of the piston bolt 5, that is, while the pilot valve is closed. According to the first embodiment, pressure-receiving area corresponding to the pressure-receiving surface A during a compression stroke is larger than pressure-receiving area corresponding to the pressure-receiving surface B during an expansion stroke.

As illustrated in FIG. 1, the solenoid 71 includes the case member 8, the rod 72, and a coil 74. The rod 72 includes an outer circumferential surface with which a plunger 69 is combined. The plunger 69 that is also referred to as a moving core is made of a ferrous magnetic body to have a substantially cylindrical shape. The plunger 69 generates thrust when the coil 74 is energized and generates a magnetic force. The rod 72 is formed to have a cylindrical shape and includes an in-rod passage 73 extending (running) through the rod 72 in the axial direction (vertical direction). The rod 72 is supported by a bush 78 embedded in a stator core 76 and a bush 100 embedded in an anchor 68 so as to be movable in the vertical direction (axial direction). Although the rod 72 is provided with the in-rod passage 73 in the first embodiment, it is also possible to utilize a solid rod, that is, the rod 72 without an inside passage.

Formed in the anchor 68 of the solenoid 71 is a shaft hole 68A extending through the anchor 68 in the axial direction. A spool back pressure chamber 70 (chamber) is formed inside the shaft hole 68A. An upper end of the valve spool 51 and a lower end of the rod 72 are in contact with each other in the spool back pressure chamber 70 located at an upper end (one side end) of the pilot valve. The spool back pressure chamber 70 is in communication with the cylinder's upper chamber 2A through an upper chamber-side communication passage (first communication passage) when the pilot valve is closed. The upper chamber-side communication passage comprises a cutout 75 formed in a distal end portion (lower end portion) of the rod 72, the in-rod passage 73, a rod back pressure chamber 101 formed in the stator core 76, a passage 102 radially extending in the stator core 76 and allowing the rod back pressure chamber 101 and an outer circumferential surface of the stator core 76 to communicate with each other, and an air vent orifice 103 functioning as a first orifice which is formed in a lateral wall of the case member 8. The first embodiment is so configured that the spool back pressure chamber 70 (chamber) and the cylinder's upper chamber 2A are in communication with each other through the cutout 75, the in-rod passage 73, the rod back pressure chamber 101, the passage 102, and the air vent orifice 103. For example, the in-rod passage 73 may be solid, and the anchor 68 and the case member 8 may be provided with a communication passage, instead of the passage 102, which allows the spool back pressure chamber 70 and the cylinder's upper chamber 2A to communicate with each other.

As illustrated in FIG. 2, provided between the head portion 7 of the piston bolt 5 and the pilot case 37 are a spool back pressure relief valve 81 (check valve), a retainer 82, a washer 83, a disc 84, a retainer 85, and the disc valve 41 in order from top down. The disc valve 41 includes an inner circumferential edge portion that is held between the inner circumferential edge portion of the pilot case 37 and the retainer 85. The washer 83 includes an outer circumferential surface 83A that is fitted to an inner circumferential surface on a lower side of an annular wall portion 7A of the head portion 7 of the piston bolt 5. Formed in the outer circumferential surface 83A of the washer is an annular groove 87 in which an O-ring 86 is mounted. The O-ring 86 liquid-tightly seals a gap between the washer 83 and the annular wall portion 7A of the head portion 7 of the piston bolt 5, namely, between a circumferential groove 89 discussed later and the cylinder's upper chamber 2A.

The spool back pressure relief valve 81 includes an inner circumferential edge portion that is held between the retainer 82 and an inner circumferential edge portion of the head portion 7 of the piston bolt 5. The spool back pressure relief valve 81 includes an outer circumferential edge portion that is seated on an annular seat portion 88 formed in a lower surface of the head portion 7 of the piston bolt 5. The circumferential groove 89 is formed between the head portion 7 of the piston bolt 5 and the washer 83. The circumferential groove 89 is used as a space for opening the spool back pressure relief valve 81. A second orifice 80 is formed in the outer circumferential edge portion of the spool back pressure relieve valve 81. The second orifice 80 allows the circumferential groove 89 and the spool back pressure chamber 70 (chamber) to communicate with each other. The spool back pressure relief valve 81 is a first check valve that allows the hydraulic fluid to flow only in a direction from the spool back pressure chamber 70 to the circumferential groove 89. Although the second orifice 80 is disposed in the spool back pressure relief valve 81 functioning as the first check valve in the first embodiment, the second orifice 80 may be placed anywhere in the communication passage. For example, the second orifice 80 may be formed by coining the seat portion 88.

The spool back pressure chamber 70 is in communication with the cylinder's lower chamber 2B through a lower chamber-side communication passage (second communication passage). The lower chamber-side communication passage includes a circumferential groove 104 formed around the valve spool 51 (base portion 52) to be located between a recessed portion 66 in a lower surface of the anchor 68 and the head portion 7 of the piston bolt 5. The lower chamber-side communication passage includes a circumferential groove 95 formed in an upper surface of the head portion 7 of the piston bolt 5, a circumferential groove 94 formed on an inner side of the seat portion 88 formed in the lower surface of the head portion 7 of the piston bolt 5, and a passage 96 vertically extending through the head portion 7 of the piston bolt 5 to allow the circumferential grooves 95 and 94 to communicate with each other. The spool back pressure chamber 70 is accordingly in communication with the circumferential groove 89 through the circumferential groove 104, the circumferential groove 95, the passage 96, the circumferential groove 94, and the spool back pressure relief valve 81.

The lower chamber-side communication passage (communication passage) includes a groove 90 formed in the upper surface of the washer 83 and extending radially outward from an inner circumferential surface of the washer 83, a groove 92 formed in a lower surface of the washer 83 and extending radially outward from the inner circumferential surface of the washer 83, a passage 91 vertically extending through the washer 83 to allow the grooves 90 and 92 to communicate with each other, and grooves 93 formed in an outer circumferential surface of the shaft portion 6 of the piston bolt 5 to allow the radial passage 44 formed in the piston bolt 5 to communicate with the groove 92. The circumferential groove 89 is accordingly in communication with the axial passage 48 through the groove 90, the passage 91, the groove 92, the grooves 93, and the radial passage 44. The grooves 93 are formed by shaping the shaft portion 6 of the piston bolt 5 so that the shaft portion 6 has width across two flats.

The flow of the hydraulic fluid will be discussed below with reference to FIG. 2.

During a compression stroke of the piston rod 9 (hereinafter referred to as "during the compression stroke"), the hydraulic fluid in the cylinder's lower chamber 2B flows into the cylinder's upper chamber 2A through the compression-side passage 16, the orifice 47A of the expansion-side check valve 47, the radial passage 46, the axial passage 48, the radial passage 44, the compression-side back pressure introducing valve 43, the compression-side back pressure chamber 38, the passage 42 of the pilot case 37, and the orifice 41A of the disc valve 41 before the compression-side main valve 36 is opened.

During the compression stroke of the piston rod 9 according to the first embodiment, the hydraulic fluid in the cylinder's lower chamber 2B is introduced into the rod back pressure chamber 101 through the compression-side passage 16, the orifice 47A of the expansion-side check valve 47, the radial passage 46, the axial passage 48, the radial passage 44, the grooves 93, the groove 92, the passage 91, the groove 90, the circumferential groove 89, the orifice 80 of the spool back pressure relief valve 81, the circumferential groove 94, the passage 96, the circumferential groove 95, the circumferential groove 104, the spool back pressure chamber 70, the cutout 75 of the rod 72, and the in-rod passage 73 before the compression-side main valve 36 is opened. Pilot pressure that is imparted to the compression-side back pressure chamber 38 therefore can be partially imparted to the rod back pressure chamber 101 during the compression stroke.

When the valve spool 51 (valve element) is displaced to move the valve portion 54 away from the seat portion 63, that is, when the pilot valve is opened, the hydraulic fluid in the cylinder's lower chamber 2B flows into the cylinder's upper chamber 2A through the compression-side passage 16, the orifice 47A of the expansion-side check valve 47, the radial passage 46, the axial passage 48, the axial passage 49, the axial passage 30, the radial passage 33, the compression-side check valve 34, and the expansion-side passage 15. In the foregoing process, a valve-opening pressure on the pilot valve can be adjusted by controlling the energizing current supplied to the coil 74 of the solenoid 71. At the same time, the pressure of the hydraulic fluid introduced from the compression-side back pressure introducing valve 43 to the compression-side back pressure chamber 38 is adjusted. This makes it possible to control the valve-opening pressure on the compression-side main valve 36.

During an expansion stroke of the piston rod 9 (hereinafter referred to as "during the expansion stroke"), the hydraulic fluid in the cylinder's upper chamber 2A flows into the cylinder's lower chamber 2B through the expansion-side passage 15, the orifice 34A of the compression-side check valve 34, the radial passage 33, the axial passage 30, the radial passage 29, the expansion-side back pressure introducing valve 28, the expansion-side back pressure chamber 23, the passage 27 of the pilot case 22, and the orifice 26A of the disc valve 26 before the expansion-side main valve 20 is opened.

When the valve spool 51 (valve element) is displaced to move the valve portion 54 away from the seat portion 63, that is, when the pilot valve is opened, the hydraulic fluid in the cylinder's upper chamber 2A flows into the cylinder's lower chamber 2B through the expansion-side passage 15, the orifice 34A of the compression-side check valve 34, the radial passage 33, the axial passage 30, the axial passage 49, the axial passage 48, the radial passage 46, the expansion-side check valve 47, and the compression-side passage 16. In the foregoing process, the valve-opening pressure on the pilot valve can be adjusted by controlling the energizing current supplied to the coil 74 of the solenoid 71. At the same time, the pressure of the hydraulic fluid introduced from the expansion-side back pressure introducing valve 28 to the expansion-side back pressure chamber 23 is adjusted. This makes it possible to control the valve-opening pressure on the expansion-side main valve 20.

During the expansion stroke, the hydraulic fluid in the cylinder's upper chamber 2A flows into the spool back pressure chamber 70 (chamber) through the upper chamber-side communication passage. To be more specific, the hydraulic fluid in the cylinder's upper chamber 2A is throttled by the air vent orifice 103 functioning as the second orifice and flows through the passage 102, the rod back pressure chamber 101, the in-rod passage 73, and the cutout 75 of the rod 72 into the spool back pressure chamber 70. The hydraulic fluid that flows into the spool back pressure chamber 70 flows through the lower chamber-side communication passage (communication passage) into the cylinder's lower chamber 2B. More specifically, the hydraulic fluid that flows into the spool back pressure chamber 70 flows into the cylinder's lower chamber 2B through the circumferential groove 104, the circumferential groove 95, the passage 96, the circumferential groove 94, the spool back pressure relief valve 81 (check valve), the circumferential groove 89, the groove 90, the passage 91, the groove 92, the grooves 93, the radial passage 44, the axial passage 48, the radial passage 46, the orifice 47A of the expansion-side check valve 47, and the compression-side passage 16.

According to a shock absorber in which a damping force adjusting mechanism is internally installed in a cylinder, the solenoid thrust is small when the issuance of a command to generate a soft damping force is made. Therefore, when load acting in an opposite direction to the solenoid thrust acting on a valve element (valve spool), namely, load obtained by adding a spring load and load generated by hydraulic pressure exceeds the solenoid thrust, this causes a problem of so-called fail-down in which the valve element is displaced to come into a fail state. Especially, the pressure-receiving area of the valve element is larger during the compression stroke than during the expansion stroke, so that the fail-down is likely to occur during the compression stroke. A reason that the pressure-receiving area of the valve element is designed larger during the compression stroke than during the expansion stroke is because it has been lately desired to set the damping force so that a damping force variable range during the expansion stroke is larger than a damping force variable range during the compression stroke. The pressure-receiving area during the compression stroke may be set smaller than the pressure-receiving area during the expansion stroke, and the damping force variable range during the expansion stroke may be set smaller than the damping force variable range during the compression stroke.

In this case, it is necessary to utilize a large-size solenoid that is capable of generating a large solenoid thrust.

According to the first embodiment, the hydraulic fluid in the cylinder's lower chamber 2B is introduced into the rod back pressure chamber 101 through the compression-side passage 16, the orifice 47A of the expansion-side check valve 47, the radial passage 46, the axial passage 48, the radial passage 44, the grooves 93, the groove 92, the passage 91, the groove 90, the circumferential groove 89, the orifice 80 of the spool back pressure relief valve 81, the circumferential groove 94, the passage 96, the circumferential groove 95, the circumferential groove 104, the spool back pressure chamber 70, the cutout 75 of the rod 72, and the in-rod passage 73 during the compression stroke. The pilot pressure imparted to the compression-side back pressure chamber 38 therefore can be partially imparted to the rod back pressure chamber 101. As described above, the first embodiment makes it possible to assist the solenoid thrust using the pilot pressure and prevent the fail-down during the compression stroke.

The first embodiment provides the following operation and advantageous effects.

The first embodiment includes the cylinder (2) in which the hydraulic fluid is sealingly contained; the piston (3) that is slidably inserted in the cylinder (2) and divides the interior portion of the cylinder (2) into the cylinder's one side chamber (2A) and the cylinder's other side chamber (2B); the piston rod (9) including one end that is coupled to the piston (3) and the other end extending outside from the cylinder (2); the expansion-side passage (15) and the compression-side passage (16) disposed in the piston (3); the expansion-side main valve (20) disposed in the expansion-side passage (15); the expansion-side back pressure chamber (23) in which the valve-opening pressure on the expansion-side main valve (20) is adjusted; the compression-side main valve (36) disposed in the compression-side passage (16); the compression-side back pressure chamber (38) in which the valve-opening pressure on the compression-side main valve (36) is adjusted; the common passage (50) allowing the expansion-side back pressure chamber (23) and the compression-side back pressure chamber (38) to communicate with each other; the valve element (51) configured to adjust the passage area of the common passage (50); the actuator (71) configured to bias the valve element (51) in one direction when current is applied; the biasing member (59) configured to bias the valve element (51) in the other direction; the chamber (70) disposed on one side of the valve element (51) and communicating with the cylinder's one side chamber (2A) and the cylinder's other side chamber (2B); the first communication passage allowing the chamber (70) and the cylinder's one side chamber (2A) to communicate with each other; and the second communication passage allowing the chamber (70) and the cylinder's other side chamber (2B) to communicate with each other. The first communication passage includes the first orifice (103), and the second communication passage includes the second orifice (80). The cylinder's one side chamber (2A) and the cylinder's other side chamber (2B) are therefore allowed to be in constant communication with each other through the first orifice (80) and the second orifice (103).

According to the first embodiment, the hydraulic fluid in the chamber (70) is circulated to the cylinder's other side chamber (2B) through the check valve (81) during the expansion stroke. This enables volume compensation for the chamber (70) with respect to an amount corresponding to the displacement of the valve element (51) when the pilot valve is opened. The valve element (51) therefore can be smoothly activated, which improves responsiveness of the pilot valve.

The first embodiment uses the check valve (81) shaped like a disc to obtain large valve-opening area (flow passage area) with a small lift amount. The first embodiment thus reduces pressure loss while the check valve (81) is open and prevents a pressure rise in the chamber (70). As compared to a case in which a coil-spring check valve is utilized, a shaft length of the pilot valve, therefore, the entire length of the shock absorber (1) can be reduced to downsize the shock absorber (1) and reduce production cost for the shock absorber (1).

According to the first embodiment, the second communication passage is in communication with the cylinder's other side chamber (2B) through the compression-side back pressure chamber (38), so that the cylinder's one side chamber (2A) and the cylinder's other side chamber (2B) are in communication with each other through the compression-side back pressure chamber (38). The hydraulic fluid in the compression-side back pressure chamber (38) is circulated to the cylinder's one side chamber (2A) through the chamber (70) during the compression stroke. In the foregoing process, the pressure generated in the compression-side back pressure chamber (38) can be adjusted by adjusting the flow of the hydraulic fluid circulated from the compression-side back pressure chamber (38) through the chamber (70) into the cylinder's one side chamber (2A), for example, using an orifice. It is therefore possible to adjust the valve-opening pressure on the compression-side main valve 36.

According to the first embodiment, the actuator comprises the rod (72) configured to displace the valve element (51) and the solenoid (71) configured to control the displacement of the rod (72). The rod (72) is provide with the in-rod passage (73) extending along the axial direction. The rod (72) is provided on one end side with the rod back pressure chamber (101) that is in communication with the chamber (70) through the in-rod passage (73). The pilot pressure imparted to the compression-side back pressure chamber (38) therefore can be partially imparted to the rod back pressure chamber (101) during the compression stroke. This assists the solenoid thrust and prevents the fail-down especially when the solenoid thrust is relatively small during the compression stroke.

During the expansion stroke, the hydraulic fluid in the cylinder's one side chamber (2A) flows through the in-rod passage (73) into the chamber (70). The hydraulic fluid that flows into the chamber (70) flows into the cylinder's other side chamber (2B) through the check valve (81) disposed in the communication passage. This prevents a pressure rise in the chamber (70) and prevents motion lock of the pilot valve, which is caused by hydraulic pressure rise.

Second Embodiment

Figure 4:
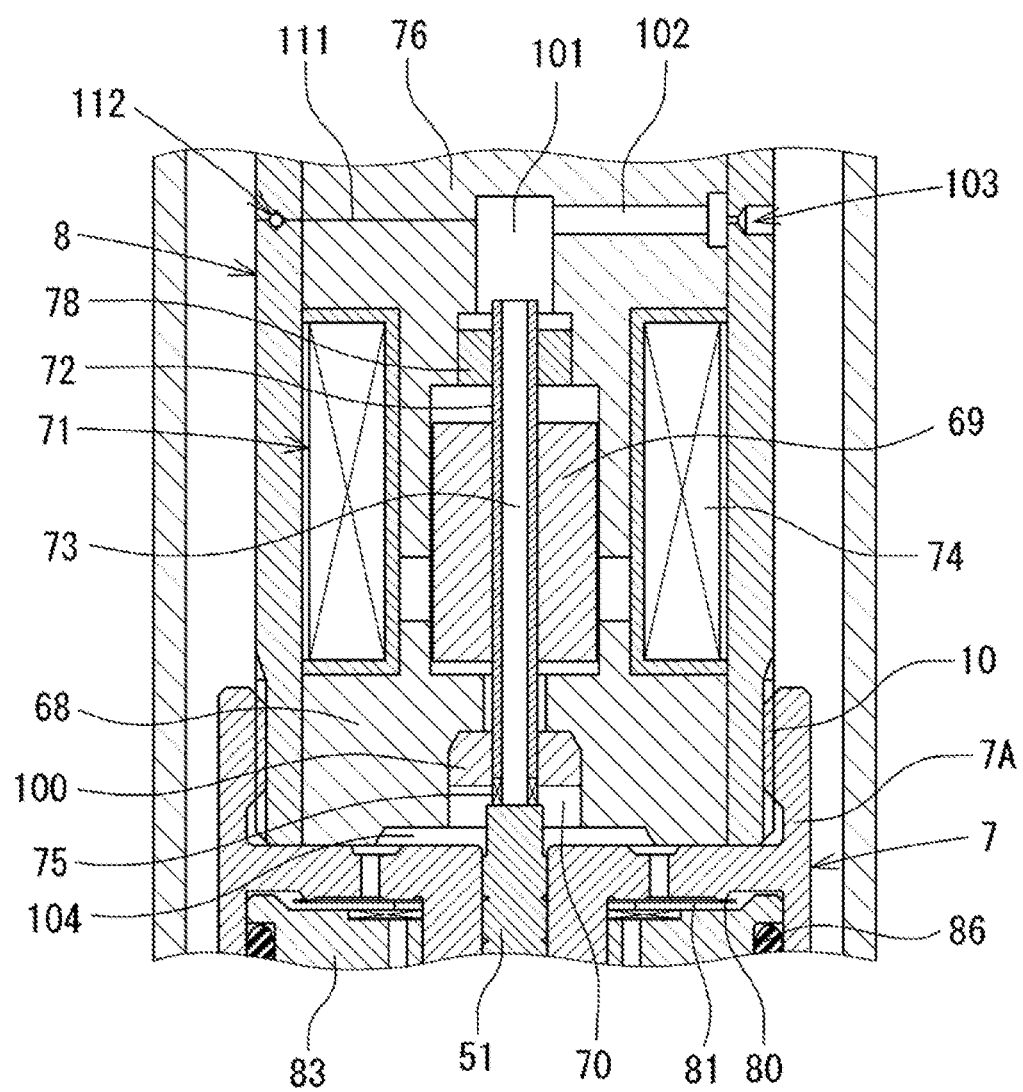
FIG. 4 is an enlarged view showing a part of a major part of a shock absorber according to a second embodiment.

The following description will explain a second embodiment mainly on the basis of differences from the first embodiment with reference to FIG. 4. Common parts with those of the first embodiment are referred to by the same terms and provided with the same reference signs.

According to the first embodiment, the solenoid thrust is assisted by the pilot pressure, to thereby prevent the fail-down when the solenoid thrust is relatively small during the compression stroke. According to the first embodiment, when the assist of the solenoid thrust using the pilot pressure becomes excessive, the valve element is not smoothly transferred to the fail state even if the current (control current) supplied to the solenoid 71 becomes 0 A (ampere). In other words, when the pressure in the rod back pressure chamber 101 becomes excessive, a valve spool 61 (valve element) is not smoothly transferred to the fail side even if the current supplied to the solenoid 71 becomes 0 A. The foregoing phenomenon, that is, poor transfer to the fail state, is likely to occur in the first embodiment.

To solve the above-described problem, according to the second embodiment, as illustrated in FIG. 4, the solenoid 71 is provided with a passage 111 allowing the rod back pressure chamber 101 and the cylinder's upper chamber 2A to communicate with each other in addition to the passage 102 in which the air vent orifice 103 is disposed. Furthermore, the passage 111 is provided with a check valve 112 functioning as a second check valve that allows the hydraulic fluid in the rod back pressure chamber 101 to circulate to the cylinder's upper chamber 2A during the compression stroke. This prevents the assist of the solenoid thrust using the pilot pressure from becoming excessive during the compression stroke and makes it possible to immediately displace the valve spool 61 (valve element) to the fail side when the current supplied to the solenoid 71 becomes 0 A. It is then possible to prevent the poor transfer to the fail state during the compression stroke. The check valve 112 is a check valve configured to open when the pressure of the hydraulic fluid in the rod back pressure chamber 101 becomes predetermined pressure. This makes it possible to maintain an assist force of the solenoid thrust using the pilot pressure and yet prevent the assist force from becoming excessive. The check valve 112 comprises, for example, a ball and a coil spring that biases the ball, which are disposed in the passage. The check valve 112 does not necessarily have to be configured in the above-described manner.

The embodiments of the invention which have been described are not intended to limit the invention but to facilitate the understanding of the invention. The invention may be modified or improved without deviating from the gist thereof and includes equivalents thereof. The constituent elements mentioned in the claims and description may be combined in any ways or omitted within a scope where the aforementioned problem can be at least partially solved or within a scope where the advantageous effects are at least partially provided.

The present application claims priority under Japanese Patent Application No. 2017-170311 filed on Sep. 5, 2017. The entire disclosure of Japanese Patent Application No. 2017-170311 filed on Sep. 5, 2017 including the description, claims, drawings and abstract, is incorporated herein by reference in its entirety.

REFERENCE SIGN LIST

1 Shock absorber, 2 Cylinder, 2A Cylinder's upper chamber, 2B Cylinder's lower chamber, 3 Piston, 9 Piston rod, 15 Expansion-side passage, 16 Compression-side passage, 20 Expansion-side main valve, 23 Expansion-side back pressure chamber, 36 Compression-side main valve, 38 Compression-side back pressure chamber, 50 Shaft hole (common passage), 51 Valve spool (valve element), 70 Spool back pressure chamber (chamber), 71 Solenoid (actuator), 80 First orifice, 81 Spool back pressure relief valve (check valve)

The invention claimed is:
1. A shock absorber comprising:
a cylinder in which a hydraulic fluid is sealingly contained;

a piston slidably inserted in the cylinder and dividing an interior portion of the cylinder into a cylinder's one side chamber and a cylinder's other side chamber;

a piston rod including one end coupled to the piston and the other end extending outside from the cylinder;

an expansion-side passage and a compression-side passage disposed in the piston;

an expansion-side main valve disposed in the expansion-side passage;

an expansion-side back pressure chamber in which a valve-opening pressure on the expansion-side main valve is adjusted;

a compression-side main valve disposed in the compression-side passage;

a compression-side back pressure chamber in which a valve-opening pressure on the compression-side main valve is adjusted;

a common passage allowing the expansion-side back pressure chamber and the compression-side back pressure chamber to communicate with each other;

a valve element configured to adjust passage area of the common passage;

an actuator configured to bias the valve element in one direction when current is applied;

a biasing member configured to bias the valve element in the other direction;

a chamber disposed on one side of the valve element and communicating with the cylinder's one side chamber and the cylinder's other side chamber;

a first communication passage allowing the chamber and the cylinder's one side chamber to communicate with each other; and a second communication passage allowing the chamber and the cylinder's other side chamber to communicate with each other, the first communication passage including a first orifice, and the second communication passage including a second orifice.

2. The shock absorber according to claim 1,
wherein pressure-receiving area of the valve element is larger during a compression stroke than during an expansion stroke.

3. The shock absorber according to claim 1,
wherein the second communication passage allows the chamber and the cylinder's other side chamber to communicate with each other through the compression-side passage.

4. The shock absorber according to claim 1, comprising:
a first check valve configured to allow a hydraulic fluid in the first communication passage to circulate to the cylinder's other side chamber during an expansion stroke.

5. The shock absorber according to claim 4,
wherein the second orifice is formed in the first check valve.

6. The shock absorber according to claim 1,
wherein the valve element is solid.

7. The shock absorber according to claim 1,
wherein the actuator includes a rod configured to displace the valve element and a solenoid configured to control the displacement of the rod;
wherein the rod is provided with an in-rod passage extending along an axial direction;
wherein the rod is provided on one end side with a rod back pressure chamber communicating with the chamber through the in-rod passage; and
wherein the first orifice allows the rod back pressure chamber and the cylinder's one side chamber to be in constant communication with each other.

8. The shock absorber according to claim 7, comprising:
a second check valve configured to allow a hydraulic fluid in the rod back pressure chamber to circulate to the cylinder's one side chamber during a compression stroke.

9. The shock absorber according to claim 8,
wherein the second check valve is a check valve configured to open when pressure in the rod back pressure chamber becomes predetermined pressure.

10. The shock absorber according to claim 1,
wherein the second communication passage is in communication with the cylinder's other side chamber through the compression-side back pressure chamber.

* * * * *